United States Patent [19]

Hartman

[11] Patent Number: 4,874,625

[45] Date of Patent: Oct. 17, 1989

[54] FLAVORING MATERIAL POSSESSING FERMENTED SOY SAUCE CHARACTERISTICS

[75] Inventor: Guy J. Hartman, Decatur, Ill.

[73] Assignee: A. E. Staley Manufacturing Company, Decatur, Ill.

[21] Appl. No.: 84,598

[22] Filed: Aug. 12, 1987

[51] Int. Cl.$^4$ .................................................. A23L 1/22
[52] U.S. Cl. .................................... 426/533; 426/520; 426/650; 426/656; 426/658
[58] Field of Search ................ 426/520, 650, 533, 656, 426/658

[56] References Cited

U.S. PATENT DOCUMENTS

| | | | |
|---|---|---|---|
| 2,305,940 | 12/1942 | Walsh | 99/141 |
| 2,446,478 | 8/1948 | Kremers | 99/140 |
| 2,835,592 | 5/1958 | Rusoff | 99/140 |
| 3,480,447 | 11/1969 | Hack et al. | 426/533 |
| 3,552,981 | 1/1971 | Luksas | 99/145 |
| 3,595,678 | 7/1971 | Shimazaki et al. | 426/533 |
| 3,879,561 | 4/1975 | Smith et al. | 426/533 |
| 3,966,985 | 6/1976 | Jonas | 426/533 |
| 4,094,997 | 6/1978 | Aishima et al. | 426/533 |
| 4,218,487 | 8/1980 | Jaeggi | 426/533 |
| 4,587,127 | 5/1986 | Akao et al. | 426/46 |
| 4,592,917 | 6/1986 | Tandy | 426/533 |

FOREIGN PATENT DOCUMENTS

| | | | |
|---|---|---|---|
| 840385 | 4/1970 | Canada | 99/139 |
| 66750 | 11/1925 | Japan . | |
| 67051 | 12/1925 | Japan . | |
| 72199 | 6/1927 | Japan . | |
| 77669 | 8/1988 | Japan . | |

OTHER PUBLICATIONS

D. Fukushima, "Soy Proteins for Foods Centering Around Soy Sauce and Tofu", J. Am. Oil Chemists' Soc., Mar., 1981, pp. 346–354.

Dehydrated Foods, Chemistry of Browning Reactions in Model Systems by John E. Hodge, Agricultural and Food Chemistry, vol. 1, No. 15, pp. 928–943.

S. Kawamura, "Earlier Studies on the Maillard Reaction by Japanese Scientists", Amino-Carbonyl Reactions in Food and Biological Systems, pp. 3–13, (Proceeding of the 3rd International Symposium on the Maillard Reaction, Susono, Shizuoka, Japan, M. Fujimaki et al., ed. Elsevier, 1986).

Food Processing, May 1987, pp. 70–72.

Soybeans: Chemistry and Technology, vol. 1, pp. 397–401, (A. K. Smith and S. J. Circle, ed., AVI Publ. Co., Westport, CT 1972).

CRC Handbook of Chemistry and Physics, p. D-21, (R. Weast, ed., CRC Press, 55th ed., 1974).

Primary Examiner—R. B. Penland
Attorney, Agent, or Firm—Michael F. Campbell; J. Daniel Wood

[57] ABSTRACT

A process of preparing an edible composition useful as a flavoring for a foodstuff, particularly as a soy sauce, is provided. A mixture of a protein hydrolyzate and a carbohydrate source are heated in the pressence of ethanol and water to a temperature and for a time sufficient to increase the mixtures's absorption of visible radiation, i.e., to brown the mixture. The process yields a flavoring having flavor notes reminiscent of a fermented soy sauce without the need for fermentation techniques. The mixture is preferably prepared by hydrating the protein hydrolyzate and carbohydrate source in water and then adding sufficient ethanol to form a slurry.

2 Claims, No Drawings

FLAVORING MATERIAL POSSESSING FERMENTED SOY SAUCE CHARACTERISTICS

FIELD OF INVENTION

This invention relates to a process of preparing an edible composition useful as a flavoring for a foodstuff and to an edible composition produced by such a process.

BACKGROUND OF THE INVENTION

Soy sauce is generally divided into two groups: fermented soy sauce and non-fermented soy sauce. D. Fukushima, "Soy Proteins for Foods Centering Around Soy Sauce and Tofu", J. Am. Oil Chemists' Soc., March 1981, pp. 346-354. Fermented soy sauce is produced by slowly fermenting a mixture of proteins and carbohydrates. This slow fermentation produces a flavor and aroma characteristic of fermented soy products. Non-fermented soy sauce is produced by rapid hydrolysis of soy proteins. Such a product does not possess the flavor and aroma of fermented products, but is made by a rapid and efficient process and has become a popular flavoring material.

Efforts to improve non-fermented soy sauce have led to the development of non-traditional fermented soy sauces. These non-traditional fermented soy sauces are generally made by hydrolyzing raw soybeans followed by fermentation of the hydrolyzate. For example, U.S. Pat. No. 4,587,127 (Akao, et al.) discloses a process for producing a liquid seasoning comprising allowing a hydrolyzate of soy sauce materials, in a liquid state at a pH of 4.0 to 9.0, to contact immobilized cells of soy sauce lactic acid bacteria for 30 minutes or more to obtain a lactic fermentation mixture which is then subjected to fermentation by a soy sauce yeast. While a fermented flavor note thus results, a need exists for a more efficient process that does not involve fermentation and its attendant limitations.

One of the characteristic reactions of the components of hydrolyzates of soy sauce materials, i.e., proteins and carbohydrates, is the "Maillard reaction". This reaction produces an increase in the product's absorption of visible radiation, i.e., "browning" of the products. For example, U.S. Patent No. 3,879,561 (Smith, et al.) describes dry condiment paraticulates produced by simultaneously drying and reacing under sub-aatmospheric pressure and at an elevated temperature aan aqueous medium which contains amino acids and/or protein hydrolyzates in conjunction with starch hydrolyzates as major dry components. The Maillard reaction is not restricted to soy sauces, and has been used for maple flavors, as described in U.S. Pat. No. 2,446,478 (Kremers), and chocolate flavor, as described in U.S. Pat. No. 2,835,592 (Rusoff). In the preparation of these flavors, the components are reacted in a substantially anhydrous molten state to provide the characteristic flavors.

A need still exits in the art for a means of producing an edible composition which possesses a fermented soy sauce character, but which can be efficiently produced.

SUMMARY OF THE INVENTION

This invention relates to a process of preparing an edible material useful as a flavoring comprising:
(a) forming a mixture comprises of a protein hydrolyzate, a ccarbohydrate source, and a liquid comprised of ethanol and water, and
(b) heating the mixture at a temperature and for a time sufficient to increase the absorption by said mixture of visible radiation, i.e. to brown said mixture.

This invention also relates to a flavoring material comprised of the product of the process of this invention. As used herein "flavoring material" means a composition which is intended to be consumed only in admixture with another edible material rather than alone due to its intense flavor characteristics.

It has been found that the use of ethanol in the liquid medium, particularly when the ethanol is a major portion of the liquid, for the Maillard reaction between a protein hydrolyzate and a carbohydrate source imparts flavor notes to the product which are characteristic of fermented soy sauce without the need for resort to fermentation techniques. Without intending to be bound by any theory, it is thought that the ethanolic nature of the liquid medium for the browning reaction influences the nature of the reactions, e.g., by esterification of the ethanol and/or by the heterogeneity of the reaction due to the relative insolubility of the reactants in ethanol, to produce flavor notes reminiscent of fermented soy sauces. Accordingly, the reaction conditions should be adjusted to retain at least a portion of the ethanol in the mixture during at least a portion of the period of increasae in absorption of visible radiation. Techniques to retain the ethanol include pressurizing the reaction vessel or equipping the vessel with a reflux condenser.

In preferred embodiments, the protein hydrolyzate is first mixed with an aqueous reducing sugar source, said source containing a minor amount of water and being substantially free of ehtanol, to form an aqueous mixture and then mixing said aqueous mixture with an amount of ethanol sufficient to form a slurry wherein the liquid medium of said slurry is comprised of a major amount of ethanol and a minor amount of water. In particularly preferred embodiments, the slurry is heated to reflux and vented to retain the ethanol in the slurry and allow escape of gases produced during the browning reaction.

DETAILED DESCRIPTION OF THE INVENTION

The protein hydrolyzates useful in the present invention can be more particularly described as alpha-amino acids, peptides obtained by partial or complete hydrolysis (enzymatic and/or acidic) of animal, plant or microbial proteins, mixtures thereof, and salts of alpha-amino acids or such peptides, and mixtures of such acids, hydrolyzates and/or salts. Preferred protein hydrolyzates are soy protein hydrolyzates wherein the soy protein has been nydrolyzed by enzymes, or under acidic aqueous conditions.

In general, hydrolyzed proteinaceous materials having a protein content of at least 25% by weight from animal and plant sources are useful in this invention. Typical protein hydrolyzates range from defatted leguminous seed materials (e.g., defatted soya flakes) to protein isolate substantially free from nonprotein constituents. Accordingly, hydrolyzed vegetable proteins (wherein protein is a functional constituent on a weight basis) frocorn, wheat, rye, barley, oats and soya protein, etc may be used as the protein portion component. Likewise, the protein portion may be comprised of yeast hydrolyzates (e.g., torula). The hydrolyzed proteins are generally obtained via enzymatic hydrolysis. The reaction products derived from the acid hydrolysis (and, typically, subsequent caustic neutralization) of defatted leguminous seed materials (preferably soybeans) having a protein content of at least about 35%, such as defatted soybean flakes (usually between about 45 to about 55% protein) are particularly suitable. These reaction products are conventionally formulated with added salt and sweetener (e.g., corn syrups) and distributed to the trade as a soy sauce. These soy sauces are commercially available in both the liquid and dry form. Further illustrative protein hydrolyzates and amino acids and salts thereof useful in practicing the present invention may also be found in an article entitled Dehydrated Foods—Chemistry of Browning Reactions in Model Systems by John E. Hodge, *Agricultural & Food Chemistry*, Vol 1, No. 15, pages 928–943; Canadiam Pat. No. 840,385 issued Par. 28, 1970; U.S. Pat. No. 3,552,981 by Luksas and 2,305,940 by Walsh.

In the present invention, the carbohydrate portion and the protein portion jointly provide the dry solids bulk of the reaction medium (on a weight basis). The dry solids weight ratio of protein hydrolyzates to carbohydrates employed in preparing the condiments herein may broadly vary, e.g., from about 20:1 to about 1:5.

The carbohydrate portion is generally comprised of a plurality of diverse carbohydrates ranging from monosaccharides to higher molecular weight starch hydrolyzates such as dextrin. Illustrative carbohydrates include the fermentable sugars (i.e., those having a degree of polymerization ranging from one to three saccharide units) such as the monosaccharides (e.g., dextrose, fructose, etc.), the disaccharides (e.g., maltose, lactose and sucrose) and the trisaccharides (e.g, maltotriose). Enhanced flavor development is achieved when at least a major weight portion of the fermentable sugar is comprised of the corn syrup reducing sugars (e.g., dextrose, maltose and/or fructose). Corn starch hydrolyzates ranging from those having a relatively low fermentable sugar content (e.g., maltodextrin) to those of a high F.E. value (e.g., 90–98% % F.E.) may be used herein as a starch hydrolyzate source.

In general, the carbohydrate source should contain or generate in situ a major amount of a reducing sugar, by weight of dry carbohydrate solids. Fructose as the major reducing sugar component has been nfound to provide a product possessing an exceptional flavor when prepared under the process conditions of the present invention. Particularly preferred carbohydrate sources are high fructose corn syrups such as ISOSWEET ™ 5500, available from A. E. Staley Mg. Co.

In addition to the reducing sugars, the presence of dextrin and/or maltodextrins as a carbohydrate source will not adversely affect the product. To the artisan, starch hydrolyzates having a D.E. of less than 20 are classified as maltodextrins. The maltodextrins and/or dextrins may be provided in the aqueous medium in a purified form (e.g., as obtained under carefully controlled hydrolyzate conditions to provide a hydrolyzate product substantially free from saccharides having a D.P. of less than 8 or by fractionation processes). Likewise, starch hydrolyzates having a wide saccharide distribution and containing a substantial amount of oeither maltodextrin and/or dextrins, may be utilized as a carbohydrate source.

The ethanol present in the reaction mixture can be any food grade ethanol and may contain varyiing amounts of water, e.g., as much as 95% by weight. The amount of any water in the ethanol should, however, be consistent with the desired ethanol concentration in the liquid medium of the reaction mixture, i.e., if the liquid medium is to be comprised of a major amount of ethanol (i.e., greater than 50% by weight), the ethanol added to the mixture obviously must be comprised of a minor amount (i.e., less than 50% by weight) of water.

The amount of ethanol in the mixture may affect the process in a variety of ways. For example, a major amount of ethanol will faavor the formation of esters, particularly at conditions of sufficiently low pH and sufficiently elevated temperatures. Such esters may contribute to the fermented characteristics of the resulting product.

Depending upon the precise nature of the protein hydrolyzate and/or carbohydrate source, the total amount of liquid in the mixture, and the proportions of ethanol and water, the physical form of the mixture can be varied. For example, if the protein hydrolyzate and carbohydrate source are sufficiently water soluble and the proportion of water in the liquid is sufficient, the mixture may be regarded as a solution. Preferably, however, the total amount of liquid will be sufficient to render the mixture a fluid and the amount of ethanol will be sufficient to render the mixture a slurry, i.e., a fluid comprised of a discontinuous solid phase suspended, e.g., by stirring, in a continuous liquid phase.

In a particularly preferred embodiment, a dry protein hydrolyzate is first mixed with an aqueous carbohydrate source (e.g., a corn syrup) containing a minor amount (i.e., less than 50% by weight of the aqueous carbohydrate source) of water. The water in the carbohydrate source is allowed to at least partially hydrate the protein hydrolyzate and, thus, facilitate mixing and association of the protein hydrolyzate with the carbohydrate source. A major aount of ethanol (i.e., an amount greater than the water in the aqueous carbohydrate source) is then mixed with the premix of protein hydrolyzate and aqueous carbohydrate source to form a slurry which is heated to cause the Maillard reaction to proceed.

The reaction mixture is heated to cause non-enzymatic browning of the mixture. Accordingly, no enzymes or micro-organisms need be added to the reaction mixture to achieve browning and the reacion mixture is substantially free of active enzymes. However, the heating of the mixture must be to a temperature and for a time sufficient to brown the mixture to the desired degree, e.g., heating at reflux for at least about five minutes. The increase in visible radiation which characterizes such browning can be measured by conventional spectrophotometric techniques, e.g. with a conventional visible spectrophotometer. However, the degree of browning generally desired is sufficient that an observer can, at least quaalitatively, detect such browning with the unaided eye. Precise conditions of heating necessary to achieve the desired degree of browning can be determined without undue experimentation. Typical heating conditions will maintain the reaction mixture at an average temperature of from abou 40° to about 200° C. for a period of from about 5 minutes to as long as 24 hours.

Because the preferred reaction medium is a slurry, the preferred means of heating the reaction mixture is by contacting the reaction mixture with a heated thermal conductor, i.e., the inner surface of a stirred vessel, the outer surface of which is proximate to a source of heat (e.g., a steam jacket). However, convection or radiant forms of heat can be applied to the reaction mixture and these forms will be most useful when the amount of liquid in the reaction mixture is insufficient to render the mixture flowable.

As noted above, the reactor should be fitted with means to retaian at least a portion of the ethanol in the reaction mixture during at least a portion of the period of the browning reaction. While the reactor may be presssurized, the evolution of gases (e.g., carbon dioxide) by the reaction mixture makes the use of a vented reactor desirable. The vent should, however, be fitted with a means to prevent passage of the ethanol, e.g., a reflux condenser, to return the ethanol to the reaction mixture, typically as an azeotrope with water.

The pH of the reaction mixture is not critical, but an acidic pH (i.e., less than 7) is preferred. The pH of the reaction mixture may be determined by the acidity or alkalinity of the protein hydrolyzate and/or carbohydrate source (e.g., the protein hydrolyzate maay, in particular, be acidic), but the pH can be adjusted by the addition of food grade acids or bases. Preferred acids are the organic acids such as citric, tartaric, acetic, etc.

Other suitable optional additives to the reaction mixture include yeast extracts and/or other flavor enhancing components, e.g. 5nucleotide sources. While yeast extracts tend to augment the fermented character of the product, they are not an essential ingredient. Preservatives such as salt (e.g., sodium and/or potassium chloride) can also be added.

The product of the reaction mixture can be used directly as a flavoring, but is preferably diluted with an aqueous diluent to dissolve any solids contained therein. Examples of aqueous diluents include potable water optionally containing other optional additives, e.g., preservatives, colorings, flavors, etc. Also useful as a diluent are non-fermented and/or fermented soy sauces which are flavored and/or extended by mixture with the reaction product.

The edible material which can be flavored by the flavoring materials of this invention include a wide variety of foodstuffs, particularly those wherein a meaty flavor or taste is desired. Illustrative examples of edible materials which may have incorporated therein the flavoring materials of this invention include snacks, vegetable and/or meat soups, gravies, sauces (e.g. barbacue sauces), onion and garlic flavored products, pickel relish, mustard, catsup, chili sauce and the like. Forms of these products include dry mixes, frozen concentrates, canned packaging, and the like The following examples are intendded to illustrate the invention rather than limit the scope hereof and all parts, percentages and ratios are by weight unless otherwise noted.

EXAMPLE 1

The following ingredient were added to a stirred batch reactor in the following amounts: 23 paarats of a dry, soy protein cid hydrolyzate having at leasat 80% free amino nitrogen to total nitrogen (available from A. E. Staley Mfg. Co. as STALEY®115 Spray Dried Soy HVP), 30 paarts high fructose corn syrup containing 55% fructose, d.s.b. and 77% total solids (available from A. E. Staley Mfg. Co. as ISOSWEET™ 5500 HFCS), 3 parts autolyzed yeast extract and 36 parts pure food-grade ethanol. The mixture was stirred and heated for two hours at 100° C. whereupon 2.5 parts citric acid was added. The mixture was then heated for another 18 hours at 100° C. The product was then allowed to cool to room temperature. The product can be used as a soy sauce or mixed with a chemical soy sauce as an extender and/or to enhance the flavor thereof.

EXAMPLE 2

The following ingredients were premixed ii na stirred batch reactor: 23 parts of a soy protein acid hydrolyzate having at least 80% free amino nitrogen to total nitrogen (available from A. E. Staley Mfg. Co. as STALEY®115 Spray Dried Soy HVP), 30 parts high fuctose corn syrup containing 55% fructose, d.s.b. and 77% total solids (available from A. E. Staley Mfg. Co. as ISOSWEEP™ 5500 HFCS), 3 parts autolyzed yeast extract. The premix was mixed until visibly uniform whereupon 40 parts pure food-grade ethanol was added with stirring. The reactor was sealed and heated to 90° C. to 100° C. and the contents were maintained at 90° C. to 100° C. with stirring for 2 hours. The contents were then cooled to 40°, whereupon 2.5 parts citric acid was added. The reactor was then sealed, heated to 90° C. to 100° C. and maintained at 90° C. to 100° C. for 18 hours. The mixture waas then cooled to 40° C. and 60 parts of a commercial chemical soy sauce (STALEY™ Soy Sauce) was added to the reactor. The contents were stirred until all visible residue of the reaction were dissolved. The product possessed flavor notes reminiscent of fermented soy sauce.

What is claimed is:

1. A process of preparing an edible material useful as a flavoring consisting essentially of:
   (a) first mixing a protein hydrolysate with an aqueous reducing sugar source, said aqueous reducing sugar source being substantially free of ethanol, to form an aqueous mixture;
   (b) mixing said aqueous mixture with an amount of ethanol sufficient to form a slurry wherein the liquid medium of said slurry is comprised of a major amount of weight of ethanol and a minor amount by weight of water; and
   (c) heating the slurry at a temperature and for a time sufficient to increase the absorption by said mixture of visible radiation to provide a flavoring having flavor notes characteristics of fermented soy sauce without the need for resort to fermentation.

2. A process of claim 1 wherein said heating is accomplished in a vessel equipped with a vent fitted with a reflux condenser.

* * * * *